United States Patent [19]
Fuchikami et al.

[11] Patent Number: 5,492,161
[45] Date of Patent: Feb. 20, 1996

[54] PNEUMATIC TIRE WITH GROOVE STEPS HAVING SIPES

[75] Inventors: Yusho Fuchikami, Toyonaka; Takeyoshi Koyama, Moriyama; Katsuharu Mitsutake, Itami, all of Japan

[73] Assignee: Toyo Tire & Rubber Company, Limited, Osaka, Japan

[21] Appl. No.: 386,194

[22] Filed: Feb. 9, 1995

Related U.S. Application Data

[63] Continuation-in-part of Ser. No. 215,004, Mar. 21, 1994, abandoned, which is a continuation of Ser. No. 929,502, Aug. 18, 1992, abandoned, which is a continuation of Ser. No. 716,688, Jun. 17, 1991, abandoned, which is a continuation of Ser. No. 559,981, Jul. 30, 1990, abandoned, which is a continuation of Ser. No. 224,222, Jul. 28, 1988, abandoned, which is a continuation of Ser. No. 819,280, Jan. 16, 1986, abandoned.

[30] Foreign Application Priority Data

Jan. 19, 1985 [JP] Japan ........................ 60-7885

[51] Int. Cl.⁶ .......................... B60C 11/12; B60C 11/13
[52] U.S. Cl. .................. 152/209 R; 152/DIG. 3
[58] Field of Search ............ 152/209 R, 209 D, 152/DIG. 3

[56] References Cited

U.S. PATENT DOCUMENTS

| 3,893,498 | 7/1975 | Wayne | 152/209 R |
| 3,951,193 | 4/1976 | Yeager | 152/209 R |
| 4,703,788 | 11/1987 | Kusube et al. | 152/209 R |

FOREIGN PATENT DOCUMENTS

| 98002 | 8/1975 | Japan . | |
| 156405 | 9/1983 | Japan | 152/209 D |
| 92904 | 5/1985 | Japan | 152/209 D |

Primary Examiner—Geoffrey L. Knable
Attorney, Agent, or Firm—Birch, Stewart, Kolasch & Birch

[57] ABSTRACT

A pneumatic tire for preventing stones from being retained in the tread grooves whereby steps are provided on the lower half portion of the sidewalks of the grooves so as to extend from a side of the tread groove toward the center part thereof reducing the width of the groove in the lower part, and a plurality of narrow sipes are formed on end of the steps in a direction interesecting the tread groove.

9 Claims, 4 Drawing Sheets

PNEUMATIC TIRE WITH GROOVE STEPS HAVING SIPES

This application is a continuation, of application Ser. No. 08/215,004 filed on Mar. 21, 1994 which is a continuation of application Ser. No. 07/929,502 filed Aug. 18, 1992, which is a continuation of application Ser. No. 07/716,688 filed Jun. 17, 1991, which is a continuation of application Ser. No. 07/559,981 filed Jul. 30, 1990, which is a continuation of application Ser. No. 07/224,222 filed Jul. 28, 1988, which is a continuation of application Ser. No. 06/819,280 filed Jan. 16, 1986, all now abandoned.

BACKGROUND OF THE INVENTION

1. Field of the Invention

The present invention relates to a pneumatic tire for use on a truck and bus and more specifically to tread grooves of a tire for preventing stone retention.

2. Description of the Prior Art

When a tread portion of a large-sized radial tire for use on a truck or bus is provided with a reinforcing belt layer composed of tough steel cords, the rigidity of the tread portion is increased by the reinforcing layer, and movements of the tread are restrained causing the tread to easily retain stones which are very different to be removed. As a result, the groove bottom of the tread groove is damaged by the retained stones every time contact of the stones with the road surface is made during driving, and sometimes the damage reaches the reinforcing belt layer causing further damage to the steel cords of the belt layer.

The tire for use on a truck or bus is usually recapped by replacing the tread rubber when it has been worn, but it is impossible to recap a tire of which the belt layer is damaged, thus the life span of the tire is considerably shortened.

In order to prevent the tread groove of the tire from stone retention, a pneumatic tire having a groove in which a side wall of the tread groove is provided with not less than two steps has been proposed as disclosed in Japanese laid open Patent Publication No. 50-98002.

This known pneumatic tire having a groove with steps has indeed an advantage in the aspect of reducing the occurrence of stone retention at the earlier stage of the wear of tire, but a problem develops in that at later stage of the wear i.e., after the wear reaches the step portions, the groove is deformed to a shape similar to that of a conventional tread groove, causing stone retention, and the retained stone is hard to remove. Moreover, there exists another disadvantage in that when the wear of the tire advances to the step portions of the tread groove, the width of the groove is sharply narrowed to reduce the volume of the groove, thereby causing eases slipping.

SUMMARY OF THE INVENTION

Accordingly, an object of the present invention is to provide a novel tire in which a tread groove is provided which retains stones with difficulty from the initial stage of wear to the later stage thereof, and when a stone gets into the tread groove, the stone is immediately and spontaneously removed so that anti-slip characteristic of the tire is maintained at a high level even when the tire is substantially worn.

In order to accomplish the foregoing object, it has been found that when a step is formed on a side of a tread groove and sipes composed of narrow cut grooves are further formed on the step in a direction intersecting the tread groove, the occurrence of stone retention can be successfully restrained by means of the step at the earlier stage of wear, and that the rigidity of the groove portion is moderated to restrain the occurrence of stone retention by the sipes and any retained stones are easily removed even in the event of occurrence of stone retention at the later stage of wear, In other words, a pneumatic tire in accordance with the present invention is characterized in that a step is formed on a portion deeper than a middle part of the tread groove of a pneumatic radial tire so as to extend from either one side or both sides of the tread groove toward the center part thereof, reducing the width of the groove in the lower part, and narrow sipes are formed on the step at suitable intervals in a direction intersecting the tread groove.

BRIEF DESCRIPTION OF THE DRAWINGS

Other objects and features of the present invention will become apparent in the course of the following description in conjunction with the accompanying drawings wherein.

DESCRIPTION OF THE PREFERRED EMBODIMENTS

Figure 1:
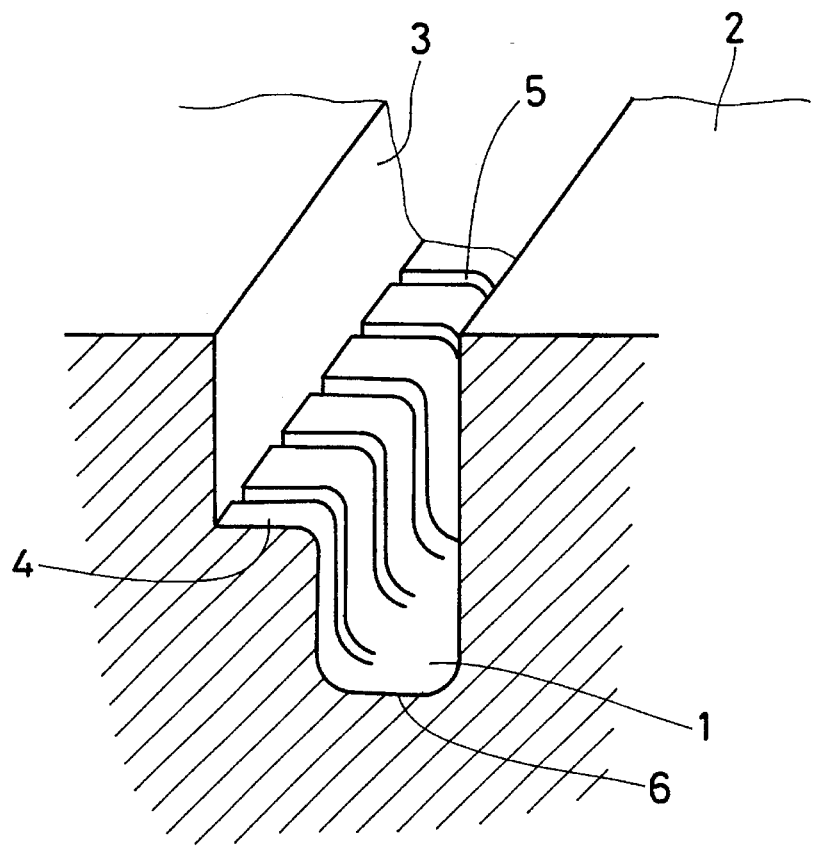
FIG. 1 is a perspective view of a tread groove of a pneumatic tire in accordance with the present invention.
Figure 2:
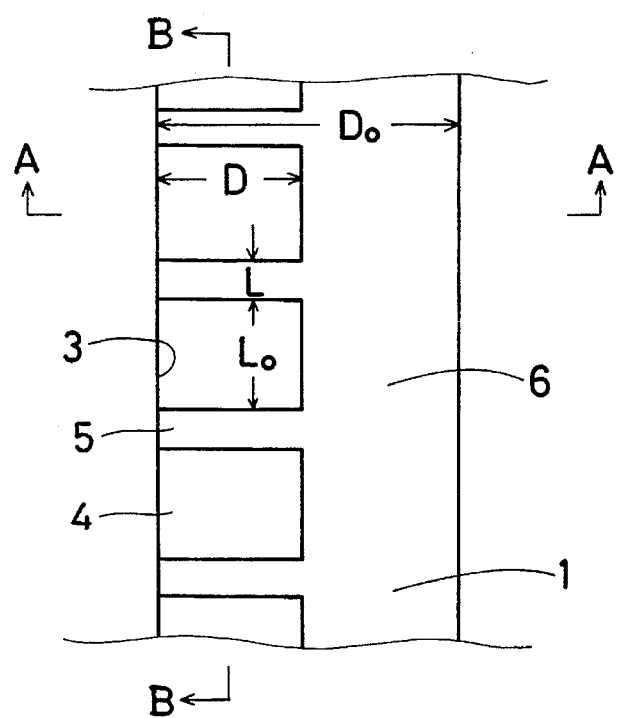
FIG. 2 is a plan view of the tread groove.

In the drawings a tread groove (1) is formed on a tread (2) of a tire. A step (4) is formed on the lower half part of the tread groove (1) so as to extend from a side wall (3) of the tire groove to the center thereof by a uniform width and reducing the width of the lower half part of the tread groove (1). Sipes (5) composed of narrow cut grooves are further formed on the step (4) at suitable distances over substantially the entire width thereof or intervals in a direction interesecting the tread groove (1) at the sidewall thereof.

Figure 3:
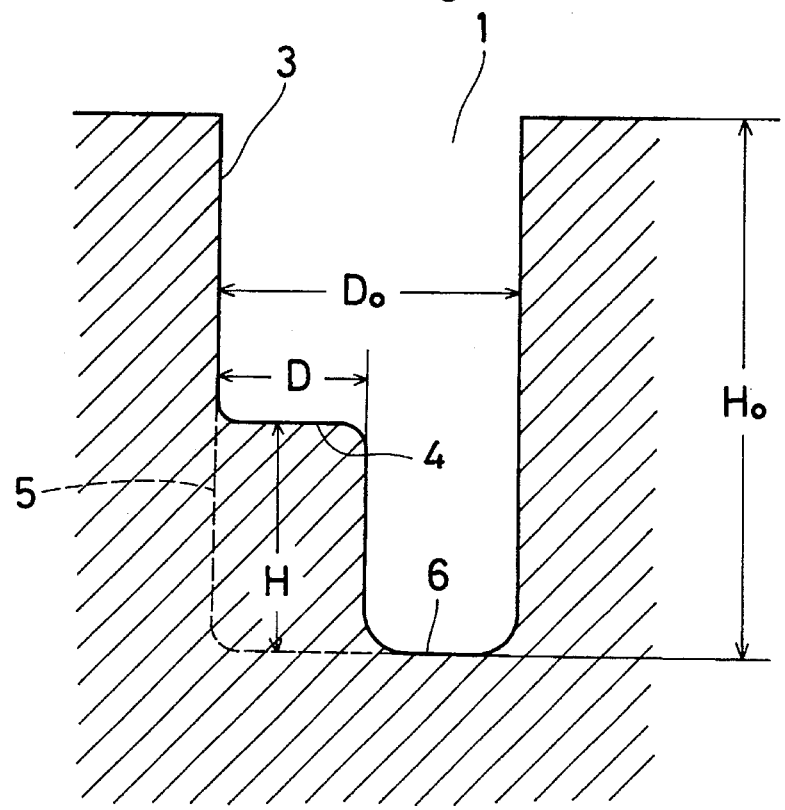
FIG. 3 is a sectional view of the tread groove taken along the line A—A of FIG. 2.
Figure 4:
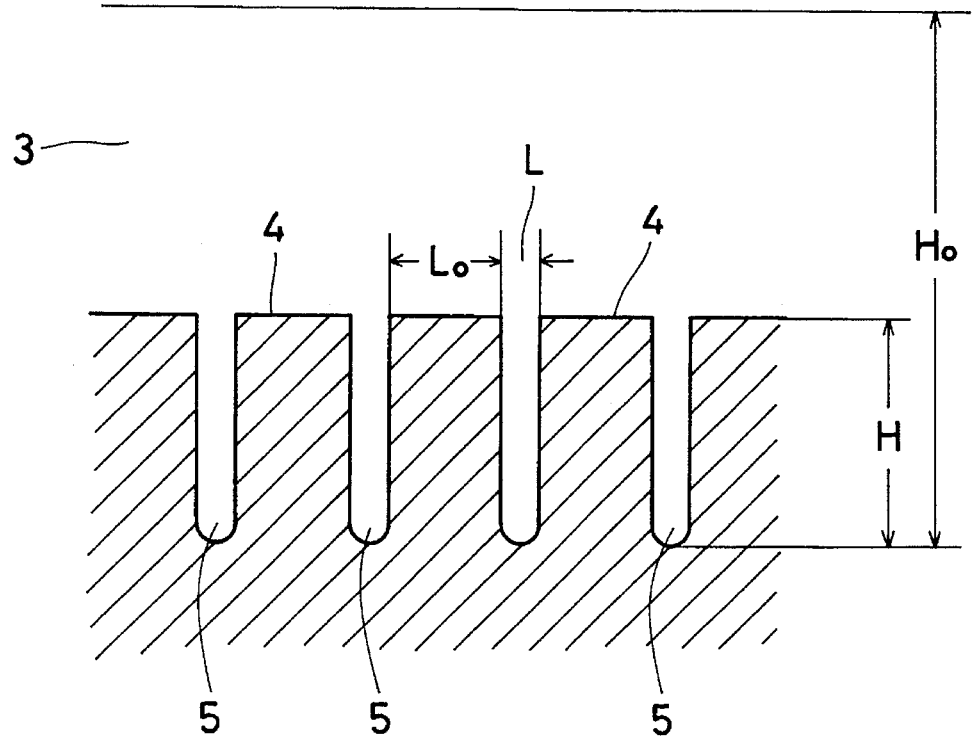
FIG. 4 is a sectional view of the tread groove taken along the line B—B of FIG. 2.

It is preferred that a height H of the step (4) as in FIG. 3, is within the range of ⅕ to ½ of the depth Ho of the tread groove. If less than ⅕, the effect of prevention of stone retention is not sufficiently attained. A width D of the step (4) can be 20 to 80% of the width Do of the tread groove (1).

It is preferred that each sipe (5) is formed as deep as the groove bottom (6), but the depth is not critical. It is also preferred that the sipes (5) be formed over the full width of the step (4), but it may be formed on a part of the width of the step (4).

An interval (i.e., distance) Lo between one sipe (5) and the other adjacent thereto is preferably within the range of 3 to 10 mm in the direction perpendicular to the longitudinal direction of the tire grooves, with one end of a sipe opening into the tread groove and the other end of the sips being closed and ending in the stepped portion. If the interval Lo is less than this range, the rigidity of the step (4) is excessively reduced to the extent of reducing the effect of preventing the stone retention at the early stage of wear. On the other hand, if the interval Lo is more than the foregoing range, the rigidity of the step (4) becomes excessively great to the extent of reducing the effect of moderating the rigidity by the sipe, and there is the possibility of damaging the groove bottom due to stone retention at the later stage of wear.

It is most effective that the width L of each sipe is such so that L/Lo is within the range of 0.1 to 0.5. If the width L exceeds this range, the tread groove and the sipes may retain stones at a later stage of wear of the tire and the groove areas become damaged finally producing giving damage to the reinforcing belt layer.

Figure 5:
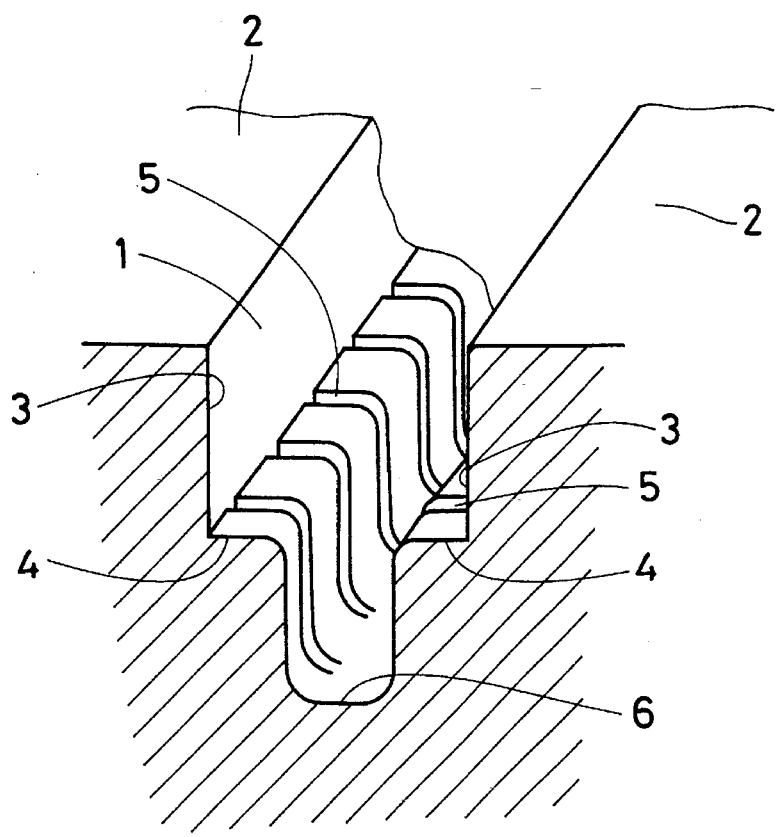
FIG. 5 is a perspective view of a tread groove of a pneumatic tire as another embodiment of the present invention.
Figure 6:
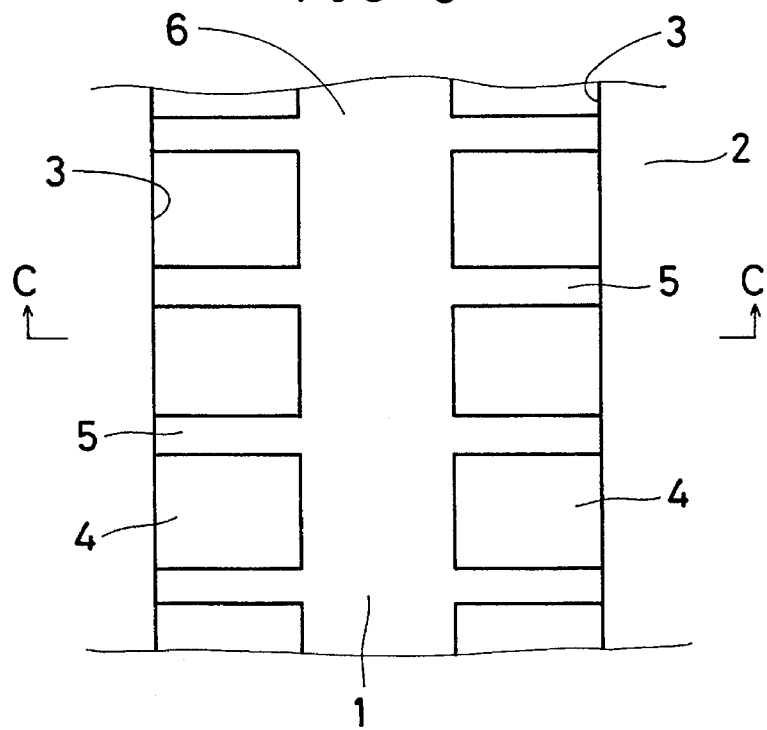
FIG. 6 is a plan view of the tread groove.
Figure 7:
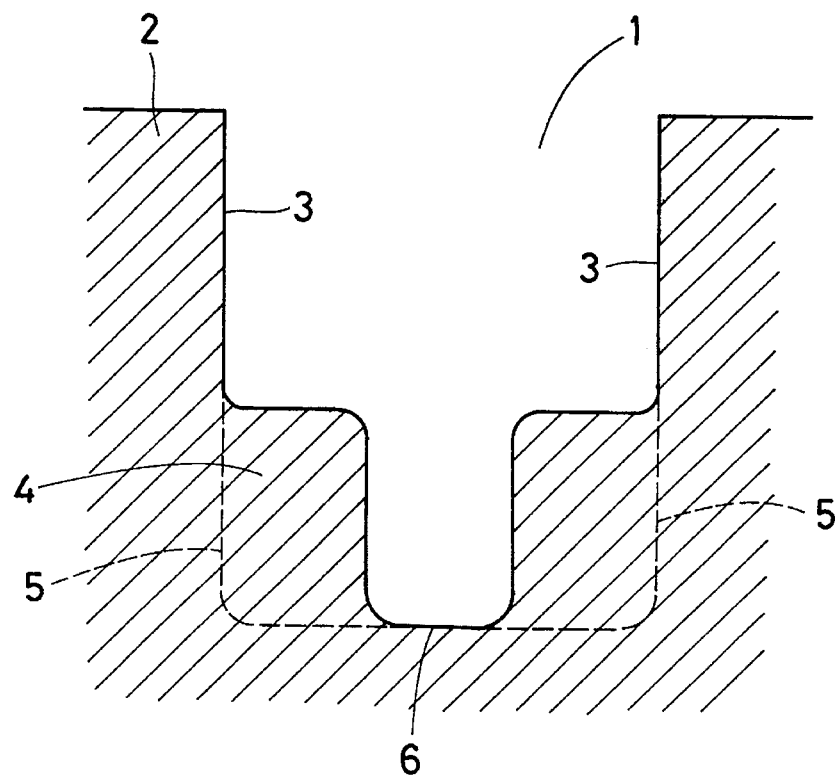
FIG. 7 is a sectional view of the tread groove taken along the line C—C of FIG. 6.

In the second embodiment shown in FIG. 5, FIG. 6 and FIG. 7, two steps (4), are formed extending from both sides (3), of the tread groove (1) toward the center part thereof, and the sipes (5) are formed on the steps respectively.

Figure 8:
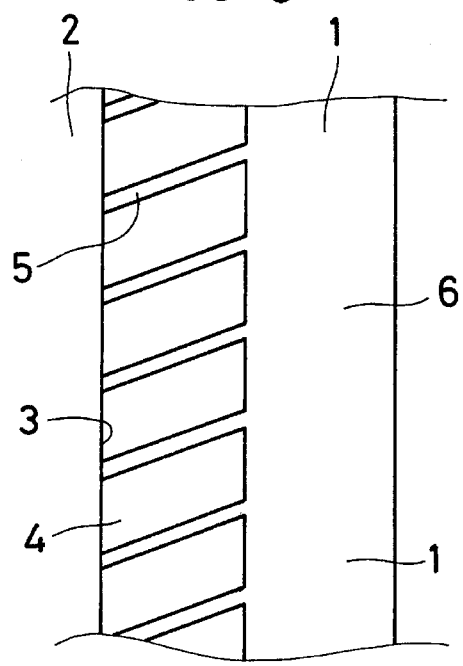
FIGS. 8 and 9 are plan views of tread grooves of pneumatic tire as further embodiments of the present invention.
Figure 9:
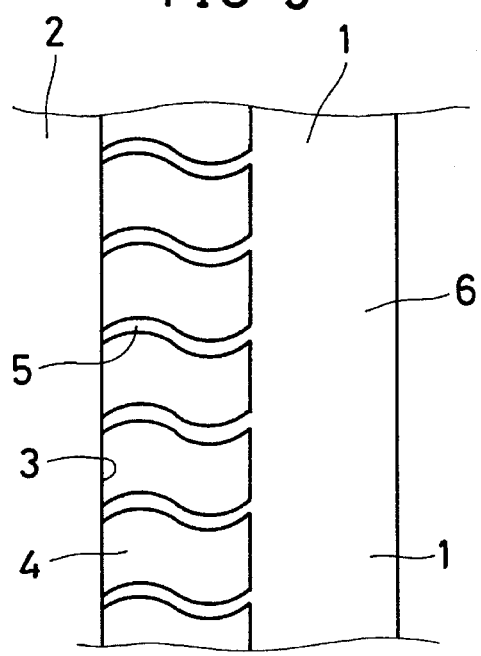

It is to be noted that the sipes (5) of the pneumatic tire in accordance with the present invention need not always be formed in a direction perpendicular to the longitudinal direction of the tread groove (1), i.e., the sipes can be formed either obliquely to the longitudinal direction of the tread groove (1), as shown in FIG. 8, or in the radial direction of the tire. It is further possible to form the sipes not in the form of straight line but in the form of curved line, as shown in FIG. 9. Furthermore, the width of each sipe and the interval therebetween are not always necessary to be regular but can be irregular depending on portions.

As has been described so far, by the pneumatic tire according to the present invention, the stone retention of the tread groove at the later stage of wear is reduced by the step formed on the side or sides thereof, and since the sipes are formed on the step to reduce the rigidity of the groove bottom portion of the tread, any retained stone is easily removed even in the case of stone retention at the later stage of wear. As a result, it becomes possible to reduce damage to the belt layer, prolonging the life span of the tire and enabling the retreading of the tire.

Furthermore, in the case of known tread grooves with steps, there exists a serious disadvantage that at the later stage of wear after the wear reaches the step area of the tire, the anti-slip property and traction property of the tire decline so rapidly that the step cannot have its height H exceeding 20% of the depth Ho of the groove. Also it is necessary for the width D of the step to be designed not more than 20% of the width Do. On the other hand, according to the present invention, since the anti-slip property and the traction property at the time of wear of the tire are considerably improved by forming the sipes on the step, it is possible to increase the height H of the step up to 20~50% of the height Ho of the tread groove, as well as the width D of the step up to 20~80% of the width Do of the tread groove, the effect being to substantially improve the prevention of stone retention.

As the present invention may be embodied in several forms without departing from the spirit of the essential characteristics thereof, the foregoing embodiments are therefore illustrative and not restrictive, since the scope of the invention is defined by the appended claims rather than by the preceeding description, and all changes that fall within the meets and bounds of the claims, or equivalents of such meets and bounds, are therefore intended to be embraced by the claims.

What is claimed is:

1. A pneumatic radial bus or truck tire comprising tread grooves having formed in the lower half of the side walls thereof a stepped portion extending from at least one side of said tread grooves toward a center thereof reducing the width of said respective groove in said lower half thereof, and narrow sipes composed of a plurality of narrow cut grooves provided in each of said stepped portions over substantially the entire width thereof and not the side walls of the upper half of the grooves, said sipes being formed at an interval in the range of 3 to 10 mm between adjacent sipes in the direction perpendicular to longitudinal direction of said tire grooves and one end of said sipe opening into said tread grooves, and the other end of said sipe being closed and ending in said stepped portions.

2. The pneumatic radial tire of claim 1, wherein a ratio of the width L of each sipe to the width Lo of interval of said stepped portion between respective sipes is within the range of from 0.1 to to 0.5.

3. The pneumatic radial tire of claim 1, wherein a width D of each step is from 20 to 80 percent (%) of a width Do of each respective tread groove.

4. The pneumatic radial tire of claim 1, wherein a height H of each step is from 20 to 50 percent (%) of a height Ho of each respective tread groove.

5. The pneumatic radial tire of claim 1, wherein each sipe is formed the entire depth of said respective stepped portion to the bottom of said groove.

6. The pneumatic radial tire of claim 1, wherein said sipes are formed in a radial direction of said tire.

7. The pneumatic radial tire of claim 1, wherein said sipes are formed in a curved line.

8. The pneumatic radial tire of claim 1, wherein said stepped portion in said groove has the upper surface with uniform width.

9. A pneumatic radial bus or truck tire comprising tread grooves having formed in the lower half of the side walls thereto, step portions extending from at least one side of each of said tread grooves toward a center thereof reducing the width of said respective groove in said lower half thereof, and narrow sipes composed of narrow cut grooves formed in each of said step portions over substantially the entire width thereof and not the side walls of the upper half of the grooves and extending to the bottom of the tread grooves, said sipes being formed at an interval in the range of 3 to 10 mm between adjacent sipes in a direction oblique to a longitudinal direction of said tire grooves, and one end of said sipe opening into said tread grooves and the other end of said sipe being closed and ending in said stepped portions.

* * * * *